United States Patent [19]

Eckenbrecht

[11] 4,025,952
[45] May 24, 1977

[54] VERTICAL SYNCHRONIZING CIRCUIT

[75] Inventor: Robert R. Eckenbrecht, East Bethany, N.Y.

[73] Assignee: GTE Sylvania Incorporated, Stamford, Conn.

[22] Filed: June 9, 1976

[21] Appl. No.: 694,239

[52] U.S. Cl. .............................................. 358/158
[51] Int. Cl.² ........................................ H04N 5/04
[58] Field of Search .............. 358/150, 158; 331/20

[56] References Cited

UNITED STATES PATENTS

| 3,526,714 | 9/1970 | Fisk et al. ........................... | 358/158 |
| 3,708,621 | 1/1973 | Yamamoto .......................... | 358/158 |
| 3,751,588 | 8/1973 | Eckenbrecht et al. ............. | 358/158 |

Primary Examiner—John C. Martin
Assistant Examiner—Aristotelis M. Psitos
Attorney, Agent, or Firm—Norman J. O'Malley; Robert E. Walrath; Robert T. Orner

[57] ABSTRACT

A vertical synchronizing circuit wherein noise pulses or signals which may accompany vertical synchronizing pulses are locked out for a predetermined time subsequent to the receipt of a vertical synchronizing pulse is shown. A counter counts pulses at the horizontal or line deflection rate. At a particular count of the counter the vertical synchronizing circuit is conditioned for receipt of a vertical synchronizing pulse. Subsequent to the receipt of a vertical synchronizing pulse, the vertical synchronizing circuit is conditioned to be unresponsive to any received pulses until the counter again counts to the predetermined count.

9 Claims, 1 Drawing Figure

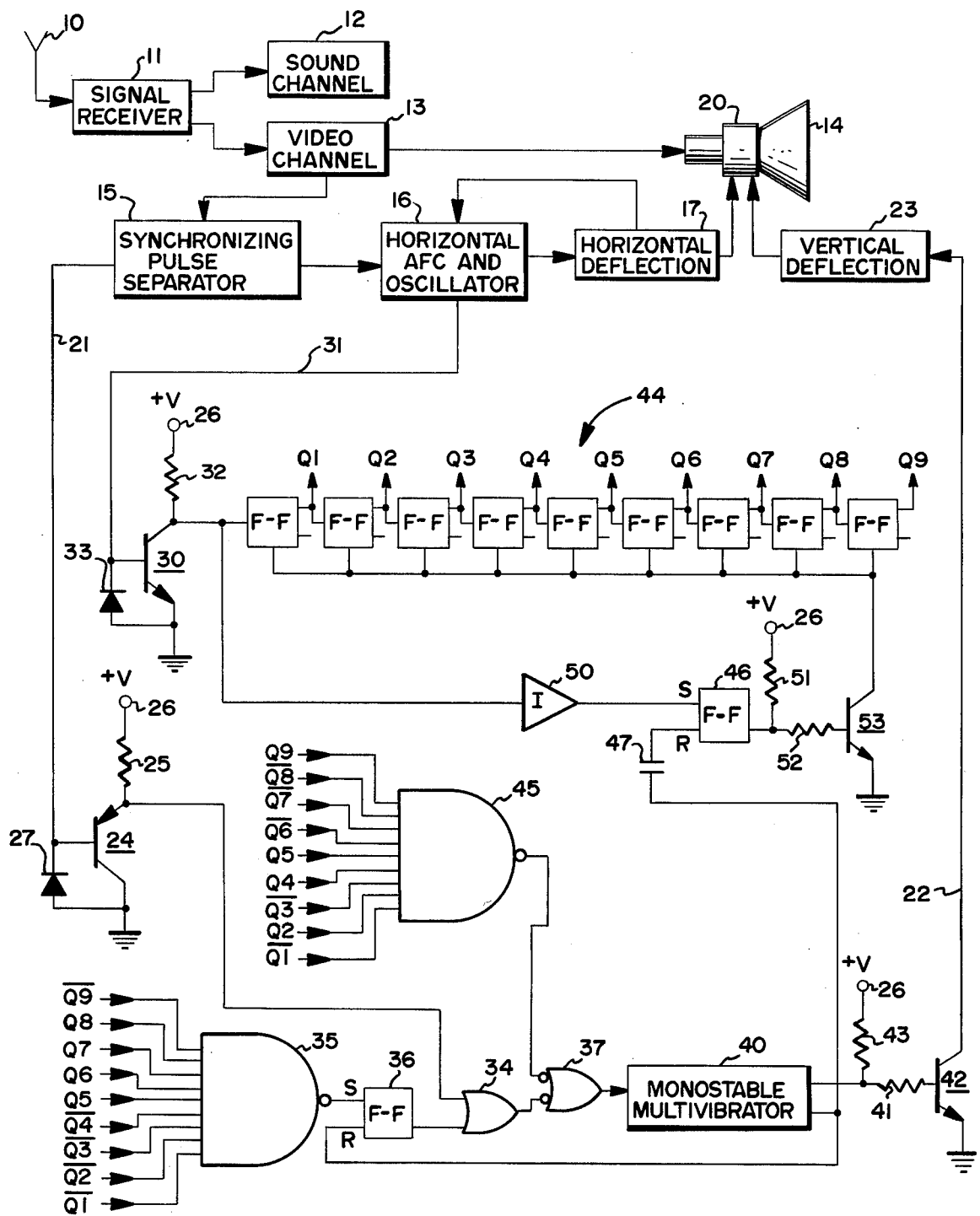

VERTICAL SYNCHRONIZING CIRCUIT

CROSS-REFERENCE TO RELATED APPLICATIONS

R. R. Eckenbrecht, "Vertical Synchronizing Circuit" Ser. No. 694,238, and R. R. Eckenbrecht et al., Vertical Synchronizing Circuit, Ser. No. 694,304, both filed on the same date and assigned to the same assignee as this application.

FIELD OF THE INVENTION

This invention relates to vertical synchronizing circuitry and more particularly to a vertical synchronizing circuit including a counter which is conditioned to be unresponsive to noise for a predetermined number of counts subsequent to the receipt of a vertical synchronizing pulse.

BACKGROUND OF THE INVENTION

Composite video signals, such as those used in typical television receivers, include video information which is intended for display on a device such as a cathode ray tube. The video information is interspersed between synchronizing pulses to synchronize scanning of the cathode ray tube in the receiver to provide a coherent display. A signal in accordance with current FCC standards has 525 horizontal scanning lines per vertical frame. The vertical frame is divided into two vertical fields, known as the odd and even fields, with each field having 262.5 horizontal lines. Thus, the horizontal deflection rate is 262.5 times the vertical deflection rate. If this relationship is maintained exactly, the signal is called interlaced, standard, or synchronous.

Numerous video signal sources such as CATV systems, video games, video players, and the like provide non-interlaced, non-standard, or asynchronous signals. Such video sources do not necessarily maintain the precise horizontal and vertical scanning rates or the scanning rate relationship between horizontal and vertical scanning required for signals transmitted in accordance with FCC standards.

A typical prior art approach to synchronizing the scanning of a cathode ray tube with synchronizing pulses contained in a composite video signal is to provide two oscillators synchronized respectively with the horizontal and vertical synchronizing pulses. While such circuitry has been used for many years with generally satisfactory results, known prior art circuitry of this type is susceptible to noise and has poor long term stability. Furthermore, in order to provide initial acquisition and retention of sync and proper operation with non-standard signals, typical prior art oscillator circuitry has a tolerance or range of frequencies within which more or less satisfactory operation can be achieved. This tolerance, however, makes the prior art oscillator circuitry susceptible to false triggering by noise and attendant improper scanning.

Due to its relatively low frequency of operation, the vertical oscillator is highly susceptible to false triggering due to various types of noise or interference. Component drift in prior art oscillator circuitry and varying signal conditions also require the use of hold controls to adjust the frequency of operation of the oscillator as components age and signal conditions vary.

A common prior art approach used to eliminate the vertical oscillator is to provide a countdown circuit which counts pulses provided at a rate related to the horizontal scanning rate. Typical circuitry of this type uses a binary counter which provides an output pulse after the proper number of pulses have been counted. The counter output pulse is provided in a timed relationship with and substituted for the received vertical synchronizing pulse. Since the vertical output pulses provided by a counter are relatively invariant, television receivers with vertical countdown circuits incorporated therein cannot readily receive and properly display non-standard signals without substantial additional circuitry to recognize such signals and modify the operation of the countdown circuit accordingly. Prior art vertical countdown circuits which incorporate such circuitry typically switch to a driven mode of operation for non-standard signals. Incorporation of such recognition circuitry and alternative mode of operation, however, results in substantial added circuitry and added expense making the use of countdown circuitry prohibitively expensive in many applications.

OBJECTS OF THE INVENTION

Accordingly, it is a primary object of this invention to provide a vertical synchronizing circuit which obviates the above-noted and other disadvantages of the prior art.

It is a further object of this invention to provide a vertical synchronizing circuit incorporating a counter which is capable of operating with both standard and non-standard signals.

It is a still further object of this invention to provide a vertical synchronizing circuit incorporating a counter which is relatively simple and inexpensive while possessing a capability of properly synchronizing scanning in a television receiver with both standard and non-standard signals.

It is a yet further object of this invention to provide a vertical synchronizing circuit including a counter to lock-out noise accompanying vertical synchronizing pulses without undue complexity and expense.

SUMMARY OF THE INVENTION

In one aspect of this invention the above and other objects and advantages are achieved in a vertical synchronizing circuit for providing vertical output pulses in synchronism with vertical synchronizing pulses contained in a composite video signal. The vertical synchronizing circuit includes a counter, vertical synchronizing pulse gating means, a vertical output pulse generator, and resetting means. The counter is connected to means for providing pulses synchronized with horizontal synchronizing pulses contained in the composite video signal for counting the pulses therefrom. The vertical synchronizing pulse gating means is connected to means for providing the vertical synchronizing pulses and to the counter for coupling vertical synchronizing pulses therethrough. The gating means is enabled at a predetermined count of the counter prior to the expected receipt of each vertical synchronizing pulse. The vertical output pulse generator is connected to the gating means for receiving the vertical synchronizing pulses and for providing the vertical output pulses in response thereto. The gating means is inhibited when each vertical output pulse is provided. The resetting means is connected to the vertical output pulse generator and to the counter for resetting the counter when each vertical output pulse is provided.

BRIEF DESCRIPTION OF THE DRAWING

The single FIGURE is a block diagram of a television receiver incorporating a preferred embodiment of the invention.

DETAILED DESCRIPTION OF THE PREFERRED EMBODIMENT

For a better understanding of the present invention, together with other and further objects, advantages and capabilities thereof, reference is made to the following disclosure in conjunction with the accompanying drawings.

While the invention will be described in connection with a typical television receiver for receiving an NTSC television signal or its equivalent those skilled in the art will realize that the invention is usable in video display systems other than television receivers and with television systems other than the NTSC system.

In FIG. 1 a signal providing means illustrated as an antenna 10 provides an RF modulated composite video signal to a signal receiver 11. Signal receiver 11 processes the received signal to provide the audio portion thereof to a sound channel 12 and the video portion thereof to a video channel 13. Video channel 13 receives a composite video signal from signal receiver 11 which is further processed to provide one or more video signals to an image display device illustrated as a cathode ray tube (CRT) 14. In the case of a color television receiver, video channel 13 includes both typical luminance and chrominance circuitry. At least the synchronizing pulse portion of the composite video signal is coupled from video channel 13 to a synchronizing pulse separator 15.

Sync pulse separator 15 provides horizontal synchronizing pulses to a horizontal AFC and oscillator 16. Oscillator 16 provides horizontal output pulses to a horizontal deflection circuit 17. Horizontal deflection circuit 17 provides suitable horizontal deflection signals to a horizontal deflection winding contained in a yoke 20 associated with CRT 14. Horizontal deflection circuit 17 also provides a feedback signal to horizontal AFC 16 to lock the phase and frequency of the oscillator pulses to the received horizontal synchronizing pulses.

Sync pulse separator 15 further provides separated vertical synchronizing pulses on a lead 21 to a vertical synchronizing circuit which provides vertical output pulses on a lead 22 to a vertical deflection circuit 23. Vertical deflection circuit 23 provides suitable vertical deflection signals to a vertical deflection winding contained in yoke 20. The vertical synchronizing circuit provides the vertical output pulses on lead 22 in synchronism with the vertical synchronizing pulses contained in a composite video signal in video channel 13.

The vertical synchronizing pulses on lead 21 are coupled to a means for providing the vertical synchronizing pulses illustrated as a transistor 24. Transistor 24 has a base connected to lead 21, a collector connected to circuit ground, and an emitter connected by a resistor 25 to a source of energizing voltage illustrated as a terminal 26. A diode 27 is connected from circuit ground to lead 21 to prevent the voltage at the base of transistor 24 from going negative. A means for providing pulses synchronized with horizontal synchronizing pulses contained in the composite video signal is illustrated as a transistor 30. Transistor 30 has a base connected by a lead 31 to oscillator 16 which couples pulses therefrom to transistor 30. An emitter of transistor 30 is connected to circuit ground and a collector is connected by a resistor 32 to source 26. A diode 33 is connected from circuit ground to lead 31 to prevent the voltage at the base of transistor 30 from becoming negative.

The vertical synchronizing pulses at the emitter of transistor 24 are coupled to a vertical synchronizing pulse gating means. The gating means is illustrated as including a vertical synchronizing pulse gate illustrated as an OR gate 34 which has a first input connected to the emitter of transistor 24. The gating means further includes a gate enabling means illustrated as a count detection gate 35 and a bistable circuit 36. Count detection gate 35 is illustrated as a NAND gate, while bistable circuit 36 is illustrated as an RS flip-flop. An output of gate 35 is connected to the set input of flip-flop 36 which has an output connected to a second input of gate 34.

Gate 34 has an output connected to a vertical output pulse generator illustrated as including a NAND gate 37 having an output connected to a monostable multivibrator 40. Multivibrator 40 has an output connected by a resistor 41 to a base of a transistor 42. Transistor 42 has an emitter connected to circuit ground and a collector connected to lead 22. The output of multivibrator 40 is further connected by a resistor 43 to source 26. A second output of multivibrator 40 is connected to a reset input of flip-flop 36.

A counter 44 illustrated as a nine-stage counter has an input connected to the collector of transistor 30. Counter 44 can include, for example, nine J-K flip-flops each having a CP input, a reset input, a Q output, and a $\overline{Q}$ output. The nine stages provide Q1-Q9 outputs, respectively, with the CP input of each stage connected to the Q output of the preceeding stage. Selected outputs of counter 44, namely the $\overline{Q1}$, $\overline{Q2}$, $\overline{Q3}$, $\overline{Q4}$, Q5, Q6, Q7, Q8, and $\overline{Q9}$ outputs, are connected to inputs of count detecting gate 35. Selected outputs of counter 44, namely the $\overline{Q1}$, Q2, $\overline{Q3}$, Q4, Q5, $\overline{Q6}$, $\overline{Q7}$, $\overline{Q8}$, and Q9 outputs, are connected to inputs of a second count detecting gate 45 which is illustrated as a NAND gate. An output of gate 45 is connected to a second input of gate 37.

The vertical synchronizing circuit further includes a resetting means illustrated as including an RS flip-flop 46. The output of multivibrator 40 is connected by capacitor 47 to a reset input of flip-flop 46. The emitter of transistor 30 is connected by an inverter 50 to a set input of flip-flop 46. Flip-flop 46 has an output connected by a resistor 51 to source 26 and by a resistor 52 to a base of a transistor 53. Transistor 53 has an emitter connected to circuit ground and a collector connected to the reset inputs of the flip-flops of counter 44.

In operation, negative-going vertical synchronizing pulses on lead 21 are coupled to the base of transistor 24. Transistor 24 is non-conducting in the absence of synchronizing pulses and conducts when a negative-going synchronizing pulse occurs. When transistor 24 conducts, its emitter voltage decreases to provide a "0" to the input of gate 34. Gate 34 is inhibited by a "1" output from flip-flop 36 when flip-flop 36 is in its reset state.

Counter 44 receives pulses at the horizontal rate via lead 31 and transistor 30 which are counted thereby. When counter 44 attains a predetermined count, gate 35 switches flip-flop 36 to a set state to enable gate 34. If a vertical synchronizing pulse occurs when flip-flop 36 is set, the pulse is coupled through gate 34 to gate 37. Gate 37 provides a 1 output to multivibrator 40 in response to the vertical synchronizing pulse. Multivibrator 40 provides a vertical output pulse of a predetermined duration via transistor 42 to lead 22 and vertical deflection circuit 23 when it is triggered by a 0 input from gate 37. Specifically, transistor 42 is normally non-conducting due to a 0 output from multivibrator 40. Multivibrator 40 provides a 1 output pulse which switches transistor 42 on to provide the vertical output pulse on lead 22. It should be noted that multivibrator 40 provides an output pulse directly in response to a vertical synchronizing pulse without being "clocked" or timed by the pulses provided to counter 44. Such timing as is used in prior art systems has been found to provide vertical jitter of the display image.

When multivibrator 40 is triggered, it provides a 0 at its second output which is coupled to the reset input of flip-flop 36 to reset flip-flop 36 and inhibit gate 34. Thus, gate 34 remains enabled until a vertical synchronizing pulse is received and a vertical output pulse is provided in response thereto or in response to a maximum count of counter 44 as will be described below. The 0 output of multivibrator 40 is also coupled via capacitor 47 to reset flip-flop 46 on the leading edge of the 0 pulse. It will be evident to those skilled in the art that the reset pulses coupled to flip-flops 36 and 46 can be derived from signals other than the output of multivibrator 40. For example, the output of gate 37 could be used as well. When flip-flop 46 is reset, a 1 output is provided to switch transistor 53 on and reset counter 44 to its zero state. The next horizontal rate pulse at the collector of transistor 30 is coupled via inverter 50 to set flip-flop 46. When flip-flop 46 is set, it provides a 0 output to switch transistor 53 off thereby allowing counter 44 to again count horizontal rate pulses.

If a vertical synchronizing pulse is missing or not detected, count detecting gate 45 detects a predetermined count of counter 44. Gate 45 provides a 0 pulse to gate 37 to trigger multivibrator 40 to provide a vertical output pulse in response to the count detected thereby. Gate 45 detects a predetermined maximum count of counter 44 which is subsequent to the expected receipt of a vertical synchronizing pulse. In the illustrated arrangement, gate 45 detects count 282. While other counts could be detected as well, the count detected by gate 45 is preferably subsequent to the time a vertical synchronizing pulse is expected, but sufficiently early to prevent collapse of the vertical scan to prevent damage of the deflection circuitry and/or CRT 14. If reception of non-standard signals which have a horizontal to vertical relationship greater than 262.5 to 1 is desired, the count detected by gate 45 is also subsequent to the highest count attained by counter 44 when such signals are received.

When the television receiver is initially turned on, a new channel is selected, or the like, the counting of counter 44 will be arbitrary with respect to the received vertical synchronizing pulses. Accordingly, the vertical synchronizing circuit will be more or less free-running and gate 45 will trigger the vertical output pulses. In the illustrated arrangement, a vertical deflection rate of approximately 56 fields per second will result assuming oscillator 16 provides pulses at approximately the standard rate. Since a rate of 56 fields per second is somewhat less than the normal vertical synchronizing pulse rate sync will be rapidly acquired within a few fields. Accordingly, gate 45 prevents collapse of the vertical scan due to a missing or undetected vertical synchronizing pulse while permitting acquisition of vertical synchronizing pulses by the vertical synchronizing circuit.

The count at which the vertical synchronizing circuit begins "looking" for a vertical synchronizing pulse is determined by the selected outputs of counter 44 connected to gate 35. In the illustrated arrangement, gate 35 detects count 240 at which time gate 34 is enabled so that vertical synchronizing pulses can be coupled therethrough. The particular count detected by gate 35 is determined primarily by the count counter 44 will achieve when it is desired to receive non-standard composite video signals with a horizontal to vertical synchronizing pulse relationship less than 262.5 to 1. If reception of non-standard signals is not desired unless the horizontal to vertical synchronizing pulse relationship is close to the standard ratio, gate 35 can detect a count higher than 240. Similarly, if it is desired to receive non-standard signals with a horizontal to vertical synchronizing pulse ratio less than that receivable by the illustrated embodiment, a lower count can be detected by gate 35. The count detected by gate 35, however, is preferably as close to 262.5 as practical so that gate 34 is inhibited for as much of the operating cycle as possible.

Accordingly, a vertical synchronizing circuit has been illustrated and described which possesses numerous advantages over the prior art. Noise is effectively locked-out by inhibiting gate 34 for as much of the operating cycle as practical or possible while assuring acquisition of vertical synchronizing pulses even though non-standard signals may be received. Furthermore, a provision is made for preventing collapse of vertical scan due to missing or undetected synchronizing pulses while permitting operation with received non-standard signals. Also, many of the advantages of vertical countdown systems are obtained without the attendant complexity and expense of such systems.

While there has been shown and described what is at present considered the preferred embodiment of the invention it will be obvious to those skilled in the art that various changes and modifications may be made therein without departing from the invention as defined by the appended claims.

What is claimed is:

1. A vertical synchronizing circuit for providing vertical output pulses in synchronism with vertical synchronizing pulses contained in a composite video signal comprising:
   means for providing said vertical synchronizing pulses;
   means for providing pulses synchronized with horizontal synchronizing pulses contained in said composite video signal;
   a vertical synchronizing pulse gate connected to said means for providing vertical synchronizing pulses;
   a counter connected to said means for providing pulses synchronized with horizontal synchronizing pulses for counting the pulses therefrom;
   gate enabling means connected to said counter and to said vertical synchronizing pulse gate for enabling said gate at a predetermined count of said counter prior to the expected receipt of each vertical synchronizing pulse;
   a vertical output pulse generator connected to said gate and to said gate enabling means for receiving said vertical synchronizing pulses from said gate and for providing the vertical output pulses in response thereto, said gate enabling means inhibiting said gate when each vertical output pulse is provided; and resetting means connected to said vertical output pulse generator and to said counter for resetting said counter when each vertical output pulse is provided.

2. A vertical synchronizing circuit as defined in claim 1 wherein said gate enabling means includes a bistable circuit having an output connected to said vertical synchronizing pulse gate and a count detecting gate connected to selected outputs of said counter and to said bistable circuit for switching said bistable circuit to a first state to enable said vertical synchronizing pulse gate, said bistable circuit being switched to a second state when a vertical output pulse is provided.

3. A vertical synchronizing circuit as defined in claim 2 including a second count detecting gate connected to selected outputs of said counter and to said generator for detecting a predetermined count of said counter subsequent to the expected receipt of a vertical synchronizing pulse and triggering said generator to provide a vertical output pulse in response to the count detected thereby.

4. A vertical synchronizing circuit as defined in claim 2 wherein said generator includes a monostable multivibrator for providing vertical output pulses of a predetermined duration and an output of said multivibrator is connected to said resetting means and to said bistable circuit.

5. A vertical synchronizing circuit for providing vertical output pulses in synchronism with vertical synchronizing pulses contained in a composite video signal comprising:
    means for providing pulses synchronized with horizontal synchronizing pulses contained in said composite video signal;
    a counter connected to said means for providing pulses for counting the pulses therefrom;
    means for providing said vertical synchronizing pulses;
    vertical synchronizing pulse gating means connected to said means for providing said vertical synchronizing pulses and to said counter for coupling vertical synchronizing pulses therethrough, said gating means being enabled at a predetermined count of said counter prior to the expected receipt of each vertical synchronizing pulse;
    a vertical output pulse generator connected to said gating means for receiving said vertical synchronizing pulses and for providing the vertical output pulses in response thereto, said gating means being inhibited when each vertical output pulse is provided; and
    resetting means connected to said vertical output pulse generator and to said counter for resetting said counter when each vertical output pulse is provided.

6. A vertical synchronizing circuit as defined in claim 5 wherein said gating means includes a vertical synchronizing pulse gate connected to said means for providing vertical synchronizing pulses and to said generator and gate enabling means connected to said counter and to said gate for enabling said gate at said predetermined count.

7. A vertical synchronizing circuit as defined in claim 6 wherein said gate enabling means includes a count detecting gate connected to selected outputs of said counter for detecting said predetermined count and a bistable circuit connected to said count detecting gate and to said vertical synchronizing pulse gate for enabling said vertical synchronizing pulse gate in response to a pulse from said count detecting gate and for inhibiting said vertical synchronizing pulse gate when each vertical output pulse is provided.

8. A vertical synchronizing circuit as defined in claim 7 including a second count detecting gate connected to selected outputs of said counter and to said generator for detecting a predetermined count of said counter subsequent to the expected receipt of a vertical synchronizing pulse and triggering said generator to provide a vertical output pulse in response to the count detected thereby.

9. A vertical synchronizing pulse as defined in claim 7 wherein said vertical output pulse generator includes a monostable multivibrator for providing vertical output pulses of a predetermined duration and an output of said multivibrator is connected to said resetting means and to said bistable circuit.

* * * * *